May 28, 1935. C. G. JANSON 2,003,080
BEARING
Original Filed June 5, 1931  3 Sheets-Sheet 1
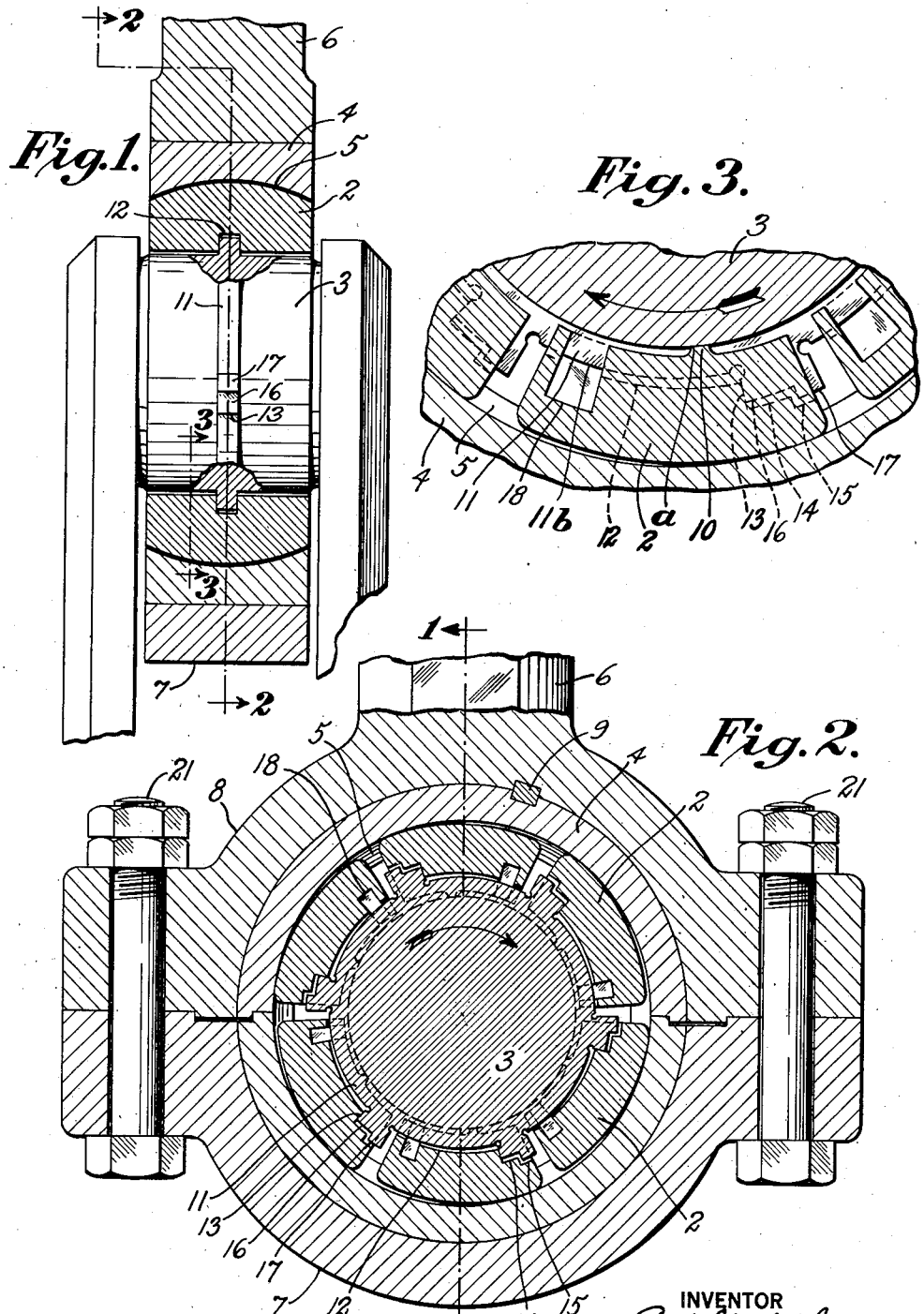

May 28, 1935.  C. G. JANSON  2,003,080
BEARING
Original Filed June 5, 1931   3 Sheets-Sheet 2

INVENTOR
Carl Gustaf Janson
BY
Wm T. Hedlund
his ATTORNEY

May 28, 1935.   C. G. JANSON   2,003,080
BEARING
Original Filed June 5, 1931   3 Sheets-Sheet 3
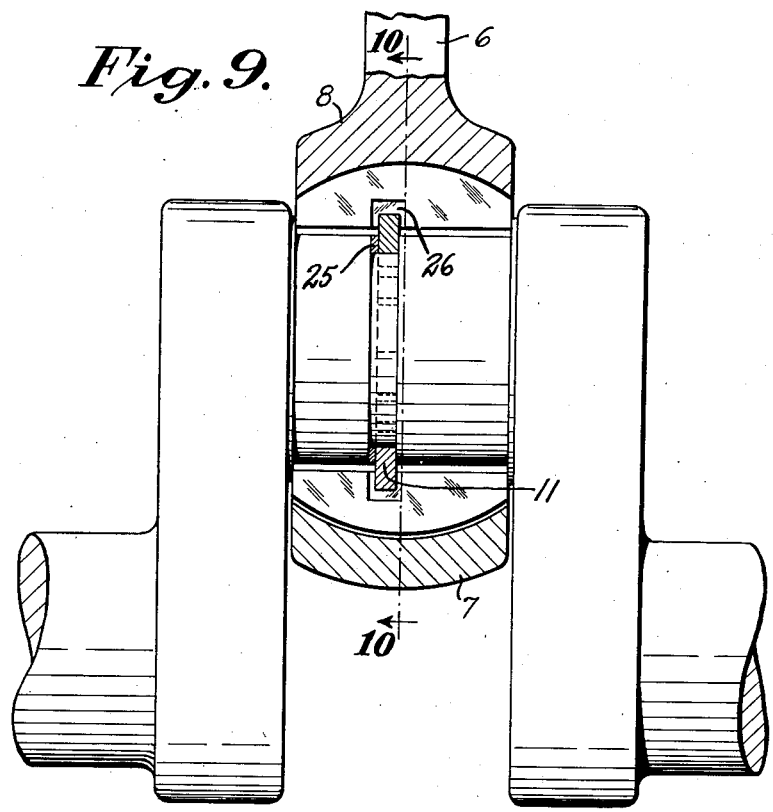
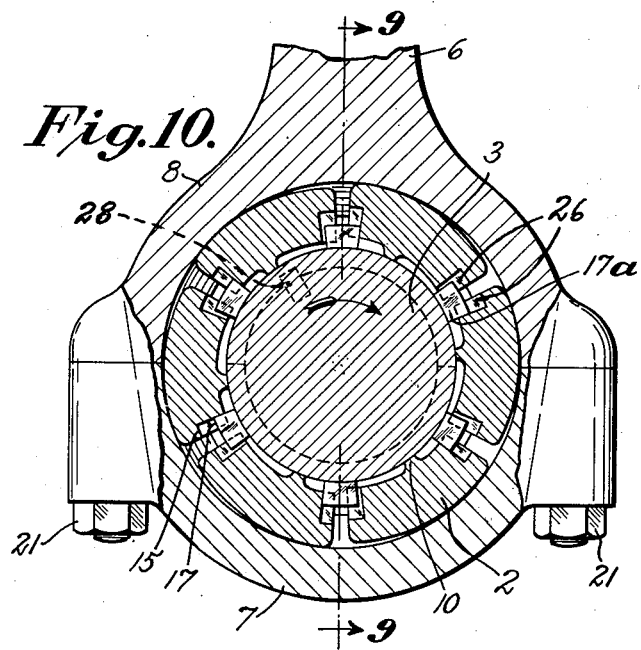
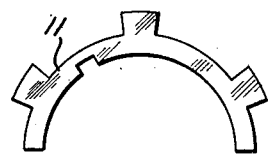
INVENTOR
Carl Gustaf Janson
BY
his ATTORNEY Patented May 28, 1935

2,003,080

UNITED STATES PATENT OFFICE 2,003,080

BEARING

Carl Gustaf Janson, Stockholm, Sweden, assignor to Aktiebolaget Nomy, Stockholm, Sweden, a corporation of Sweden Application June 5, 1931, Serial No. 542,224.
Renewed September 6, 1933. In Sweden June 10, 1930

12 Claims. (Cl. 308—73)

My invention relates to bearings and more particularly to radial bearings. Still more particularly my invention relates to bearings of the type employing a plurality of bearing blocks which are tiltable to form wedge-shaped, load-sustaining oil films. Still further, my invention relates specifically to bearings for use with a rotatable shaft or part or parts having movement confined to one relative direction of rotation. Such, for example, is the type of bearing used in connection with the main crank shaft of an automobile engine.

One particular feature of the invention is the provision of means, preferably in the form of cooperative surfaces asymmetrically disposed on the bearing parts for restricting the blocks to one manner of fitting with respect to a cooperating part.

The invention will be explained in detail in connection with the accompanying drawings showing several apparatuses embodying the invention, which drawings constitute a part of this specification and of which:

Fig. 1 is a side view, partly in section, taken on the line 1—1 of Fig. 2, of a connecting rod bearing embodying the invention;

Fig. 2 is taken on the line 2—2 of Fig. 1;

Fig. 3 is a cross-sectional view of a part of the bearing structure of Fig. 1 and is taken on the line 3—3 of Fig. 1;

Fig. 9 is a side view, partly in section, showing another form of connecting rod bearing embodying the invention, and is taken on the line 9—9 of Fig. 10;

Fig. 10 is a transverse cross-sectional view taken on the line 10—10 of Fig. 9; and Fig. 11 shows a part of the structure shown in Figs. 9 and 10.

Figure 4:
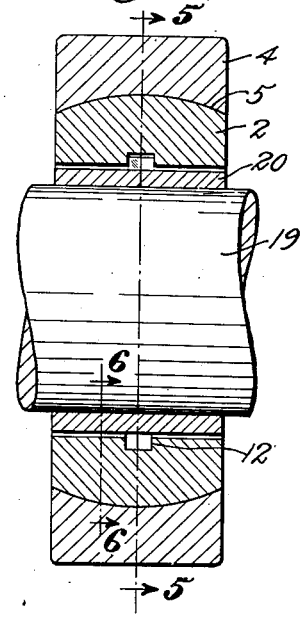
Fig. 4 is an axial cross-sectional view of another form of bearing embodying the invention, and is taken on the line 4—4 of Fig. 5.

Referring more particularly to the embodiment of the invention shown in Figs. 1, 2, and 3, the bearing comprises a plurality of bearing blocks 2 having normal operative positions radially between an inner member 3, which in this case is a crank pin, and an outer member 4. Member 4 may be made of two parts as shown and is held between the cap 7 and the yoke 8 of a connecting rod 6. The cap and yoke are secured together by means of bolts 21. In order to prevent movement of the outer member 4 with respect to the connecting rod proper, a key 9 may be used. The member 4 has an inside spherical surface 5 the center of which is the symmetric center of the bearing assembly, that is, the center of the crank pin 3.

Each of the blocks 2 is provided with a radially inwardly extending projection 10, which constitutes a tilting projection. This projection bears against the outside surface of the inner member 3. As shown in Fig. 3, this projection 10 is rearward of the center of the block, with respect to the direction of rotation denoted by the arrow. The inner member 3 has a peripheral projection 11, which is of irregular or stepped surface. The projection 11 has a plurality of surfaces 11b, a plurality of surfaces 16, and a plurality of surfaces 17, of which the surfaces 11b, are of least radial distance, the surfaces 16 are of intermediate radial distance, and the surfaces 17 are of greatest radial distance. In other words, the outer surface of the projection 11 is stepped up from the surface 11b to the surface 16 and is again stepped up from the surface 16 to the surface 17. As shown in Fig. 1, the projection 11 is symmetric with respect to the bearing. Radially in line with the projection 11, each block 2 is cut away at 12, 14, and 15 to form steps adjacent the stepped surfaces 11b, 16, and 17 of the projection 11. Thus there is a recess centrally disposed in each block which cooperates with the projection 11. The recesses in the blocks 2 are but slightly wider than the projection 11. The projection 11 serves in connection with the block recesses to keep the parts in axial alignment. The outwardly extending surface 13 between the surface 11b and the surface 16 constitutes an abutment against which that surface of the block abuts which extends radially between the surface 12 of the block recess and the surface 14 of the block recess. When the inner member 3 is rotated relative to the outer member in the direction shown by the arrow in Fig. 3, the block abuts against the surface 13 and is tilted on the forward edge $a$ of the projection 10, the forward part of the block moving radially inward to form a wedge-shaped space between the block and the surface 5. Since the block is cut away at 14 and 15 at the rear end thereof with respect to the direction of rotation, a recess 18 is preferably provided at the forward portion thereof to balance the block with respect to weight of material. Obviously, the recess 18 may be of any shape.

The forward end of each block is limited in peripheral movement both by the respective abutment 13 and the rear edge of the part of the projection 11, next forward of the block, extending outwardly to the surface 17.

By stepping the block and the projection 11 as at 14 and 16, the block and the projection 11 are respectively so shaped that the block is restricted to one manner of fitting with respect to the inner member. It will be seen that if the block were inverted so that the step 14 were forward instead of rearward with respect to the direction of rotation, the surface 12 could not be adjacent the surface 11b since the step 14 would be prevented from sufficient inward movement due to the surface 17. Thus, both for the original assembly of parts and for reassembly in case the bearing is taken down, assurance may be had that the bearing blocks will be fitted in only one respective relation. This is important particularly with tiltable blocks having offset portions which are asymmetrical since, if one or more blocks were inserted incorrectly, the wedge-shaped steps might not be formed in the right direction. To permit the blocks to be put in backwards might result in metal-to-metal contact and destruction of the bearing. The spherical surface 5 is preferred since it compensates for any tendency of the parts to move out of alignment. Furthermore, this spherical surface takes up a certain amount of axial thrust.

Figure 5:
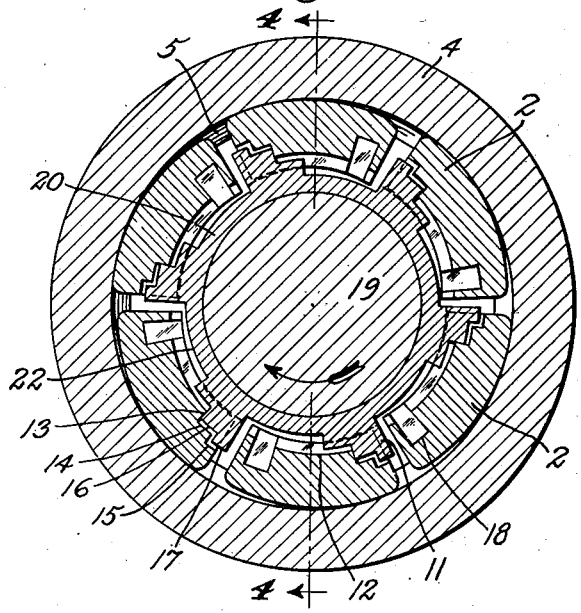
Fig. 5 is a transverse cross-sectional view taken on the line 5—5 of Fig. 4.
Figure 6:
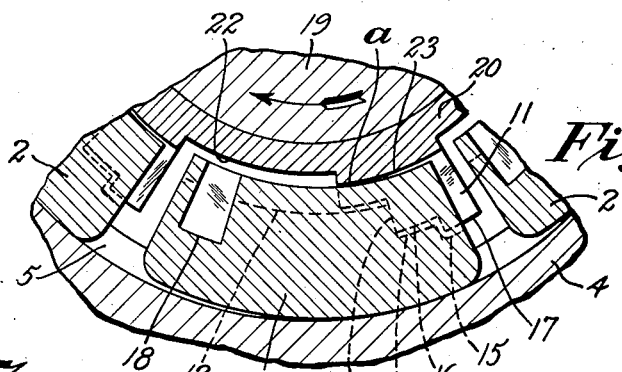
Fig. 6 is a view taken on the line 6—6 of Fig. 4.
Figure 7:
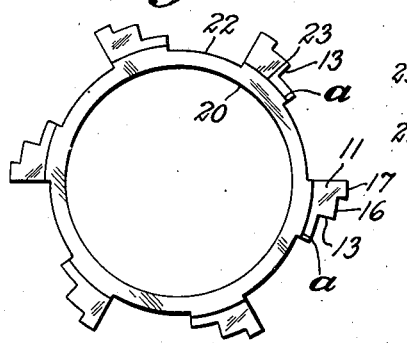
Fig. 7 is an end view of one member of the bearing assembly shown in Figs. 4, 5, and 6.
Figure 8:
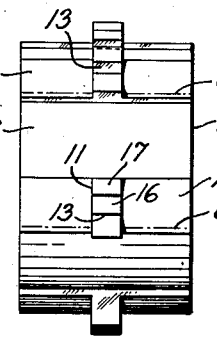
Fig. 8 is a side view of the member shown in Fig. 7.

In the embodiment shown in Figs. 4 to 8, inclusive, like reference characters in general represent like parts. This embodiment differs essentially from that above described in that the tilting edges are provided on the inner member instead of on the blocks. The parts 19 and 20 in this embodiment correspond to the part 3 in the previous embodiment. The member 20 is a separate ring secured to the shaft 19. The driving ring 20 is provided with axial recesses 22 and cylindrical surfaces 23, the step between these surfaces constituting tilting shoulder a. When the shaft 19 is rotated as indicated by the arrow, the blocks tilt radially inward into recesses 22. The recesses 22 extend the whole width of the bearing so that the projection 11 is made up of a number of projecting parts, each at the rearward end of a block. It will be seen that in this case likewise due to the offsets at the rear end of the block it is impossible to insert any block in but one relation with respect to the driving member 20. Thus there is an assurance that the blocks will always be positioned to tilt correctly and that the wedge-shaped films will always be formed in the same manner.

In the embodiment shown in Figs. 9 through 11 the same result is obtained by making the parts asymmetric axially instead of radially. The ring 11 is off-center with respect to the bearing, as clearly shown in Fig. 9. This ring may be made up of several parts and may be held in place by a caulking strip of soft metal 25 and, if desired, by a key 28. The parts of the ring 11 may be electrically welded at the ends in order to connect the parts with each other. The ring 11 may also if desired be electrically welded to the crank pin. At the ends of all of the blocks are asymmetrically disposed recesses 26 which are radially in alignment with the projecting parts 17a. It is impossible to place the blocks 2 in this embodiment in any but one position relative to the crank pin 3 since if the blocks were reversed as to position, the recesses 26 would be on the other side of the center line with respect to the member 11, and the projecting parts 17a would strike the main inner surface of the block from which the projection 10 extends, and thus it would be impossible for the blocks to be fitted into the bearing.

While I have described several forms of apparatus for carrying out the invention, it will be obvious that the invention is susceptible of embodiment in a variety of other structures, wherefore I am not to be limited to the precise forms shown.

What I claim is:

1. A bearing comprising an inner member, an outer member, said members being relatively rotatable, and a bearing block between said members, said block and said inner member having irregular surfaces to cause tilting of the block comprising a projection on said inner member and a recess in said block to cooperate with said projection, the projection and recess in operative position being asymmetric with respect to the block to restrict the block to one manner of fitting with respect to the inner member.

2. A bearing comprising an inner member, an outer member, said members being relatively rotatable, and a bearing block between said members, said block and said inner member having irregular surfaces to cause tilting of the block comprising a projection on said inner member and a recess in said block to cooperate with said projection, the projection and recess in operative position being axially asymmetric with respect to the block to restrict the block to one manner of fitting with respect to the inner member.

3. A bearing comprising an inner member, an outer member, said members being relatively rotatable, and a bearing block between said members, said block and said inner member having irregular surfaces to cause tilting of the block comprising a projection on said inner member and a recess in said block to cooperate with said projection, the projection and recess in operative position being radially asymmetric with respect to the block to restrict the block to one manner of fitting with respect to the inner member.

4. A bearing comprising an inner member, an outer member, said members being relatively rotatable, and a bearing block between said members, said block and said inner member having irregular surfaces to cause tilting of the block comprising a projection on said inner member and a recess in said block to cooperate with said projection, the projection and recess in operative position being asymmetric with respect to the block to restrict the block to one manner of fitting with respect to the inner member, and said block and said outer member having cooperating spherical surfaces.

5. A bearing comprising an inner member, an outer member, said members being relatively rotatable, and a bearing block between said members, said block and said inner member having irregular surfaces to cause tilting of the block comprising a projection on said inner member and a recess in said block to cooperate with said projection, the projection and recess in operative position being asymmetric with respect to the block to restrict the block to one manner of fitting with respect to the inner member, and said projection providing an abutment for the block and said block having a tilting shoulder between the center of the block and the abutment.

6. A bearing comprising an inner member, an outer member, said members being relatively rotatable, and a bearing block between said members, said block and said inner member having irregular surfaces to cause tilting of the block comprising a projection on said inner member and a recess in said block to cooperate with said projection, the projection and recess in operative position being asymmetric with respect to the block to restrict the block to one manner of fitting with respect to the inner member, and said projection providing an abutment for the block, said block having a tilting shoulder between the center of the block and the abutment, and said block and said outer member having cooperating spherical surfaces.

7. A bearing comprising an inner member, an outer member, said members being relatively rotatable, and a plurality of bearing blocks between said members, said bearing blocks and one of said members having cooperating irregular surfaces to cause tilting of the blocks, and means for restricting the blocks to one manner of fitting with respect to said one of said members.

8. A bearing comprising an inner member, an outer member, said members being relatively rotatable, and a bearing block between said members, a peripherally extending projection on said inner members, said block being recessed to cooperate with said projection, means for limiting peripheral movement of the block relative to the projection and said projection having different radial extents at the ends of the blocks.

9. A bearing comprising an inner member, an outer member, said members being relatively rotatable, and a plurality of bearing blocks between said members, said bearing blocks and one of said members having cooperative recesses and projections to cause tilting of the blocks, and means for restricting assembly of the bearing to one directional position of the blocks with respect to said one of said members.

10. A bearing comprising spaced relatively rotatable members, and a plurality of bearing blocks between said members, said bearing blocks and one of said members having cooperative recesses and projections to cause tilting of the blocks, and means for restricting assembly of the bearing to one directional position of the blocks with respect to said members.

11. A bearing comprising an inner member, an outer member, said members being relatively rotatable, and a bearing block between said members, said block and said inner member having stepped surfaces to cause tilting of the block comprising a projection on said inner member and a recess in said block to cooperate with said projection, the projection and recess in operative position being asymmetrical with respect to the block to restrict the block to one manner of fitting with respect to the inner member.

12. In a bearing for a connecting rod, an inner member, an outer member, said members being relatively rotatable, a plurality of bearing blocks between said members, and a projection on each bearing block for contacting said inner member, said projection being located nearer one end of the block than the other said inner member and said blocks having cooperative recesses and projections for restricting assembly of the bearing to one directional position of the blocks with respect to said inner member.

CARL GUSTAF JANSON.